United States Patent Office 3,219,634
Patented Nov. 23, 1965

3,219,634
POLYURETHANES BASED UPON A POLYEPI-
CHLOROHYDRIN POLYOL
John William Watson, Sutton Coldfield, and Donald Whitworth Pounder, Hall Green, Birmingham, England, assignors to Dunlop Rubber Company Limited, a British company
No Drawing. Filed Mar. 8, 1961, Ser. No. 94,173
Claims priority, application Great Britain, Apr. 5, 1960, 11,932/60
13 Claims. (Cl. 260—77.5)

This invention relates to improvements in and relating to polyurethanes and to a method for the preparation of such polyurethanes.

Polyurethanes based on polyesters, polyesteramides and polyamides are known for use as coatings and also for use as moulded articles.

It is the object of this invention to provide polyurethanes which have an improved resistance to attack by chemicals such as acids, alkalis and water and which also can be used as a solvent-resistant coating.

Accordingly, the present invention provides a solid polyurethane derived from a linear or branched polyether polyol in which the repeating monomer unit has the general formula, —CH(CH$_2$X)CH$_2$—O—, wherein X represents a fluorine, chlorine or bromine atom or cyano group with or without a polyether polyol having the general formula HO(C$_n$H$_{2n}$O)$_m$H, wherein $n$ and $m$ are integers.

According to the invention also a method for the preparation of solid polyurethanes comprises mixing a polyurethane prepolymer containing at least two isocyanato or isothiocyanato end groups based on a linear or branched polyether polyol in which the repeating monomer unit has the general formula

—CH(CH$_2$X)CH$_2$—O—, wherein X represents a fluorine, chlorine or bromine atom or cyano group with a cross-linking agent for the said prepolymer containing at least two active hydrogen atoms each of which is capable of reacting with an isocyanato or isothiocyanto group and allowing the polyurethane prepolymer to become cross-linked.

The polyurethane prepolymer used to prepare the solid polyurethanes according to the invention is prepared by reacting a polyether polyol which may be linear or branched and in which the repeating monomer unit has the said general formula with an amount in excess of an equimolar quantity of an organic polyisocyanate or polyisothiocyanate. Typical polyether polyols are polyepifluorhydrin, polyepichlorhydrin and polyepibromhydrin. It is, however, preferred to use a linear polyepichlorhydrin although a branched polyepichlorhydrin can be used.

The organic polyisocyanate or polyisothiocyanate can be an aliphatic or aromatic compound but preferably is a diisocyanate such as hexamethylene diisocyanate, tolyl diisocyanate or naphthalene diisocyanate. However, an organic triisocyanate can also be used in admixture with the diisocyanate. When the polyether polyol used to prepare the prepolymer contains two hydroxyl groups per molecule, then up to 20 percent molar proportion of an organic triisocyanate based on the molar proportion of the polyol can be used. When the polyol contains three hydroxyl groups per molecule, then no more than 5 percent molar proportion of the triisocyanate should be used.

The cross-linking agent which is mixed with the polyurethane prepolymer for the preparation of solid polyurethanes must contain, in general, at least two active hydrogen atoms each of which is capable of reacting with an isocyanato or isothiocyanato group of the prepolymer thus causing this to set.

When the prepolymer is prepared from a polyether polyol containing only two hydroxyl groups per molecule, then the cross-linking agent should preferably contain at least three active hydrogen atoms each of which is capable of reacting with an isocyanate or isothiocyanate group. However, the cross-linking agent can be a compound containing only two active hydrogen atoms which, after reacting with two isocyanate or isothiocyanate groups, is then capable of reacting with further isocyanate or isothiocyanate groups.

Typical examples of cross-linking agents are water, polyhydroxy compounds such as glycols, and polyhydric alcohols, e.g., trimethylolpropane, amino-alcohols and polyamines. When water is used as the cross-linking agent, it is preferred to dissolve this in a volatile organic solvent for the prepolymer and then to add the mixture so obtained to the prepolymer. Mixtures of the various cross-linking agents can also be used.

In use the polyurethane prepolymer is mixed with the cross-linking agent and then the composition so obtained is applied to articles to be coated or placed in a mould and allowed to set. If desired, the composition is dissolved in an organic solvent therefor, when the composition is used as a coating. The reaction between the cross-linking agent and the prepolymer can be accelerated by heating the composition to a temperature of 100° C. to 200° C., for example, but, however, especially when the composition is used as a coating, it is preferred to allow the composition to set at room temperature. To accelerate the reaction at room temperature it is preferable to add a catalyst to the composition immediately prior to use. The catalyst which can be used is usually a group IV metal-organic compound such as a dialkyl metal diester, e.g., dibutyl tin dilaurate, a dialkyl metal oxide, a dialkyl metal sulphide, a dialkyl metal dihydroxide, a dialkyl metal dihalide and a metal diester such as stannous octate, lead hexoate, titanium laurate or zirconium lauroxide. Ferric acetylacetonate can also be used. Also tertiary amines can be used as catalysts, the preferred amine being triethylene diamine, i.e. 1,4-diazabicyclo-2,2,2-octane.

The composition containing the polyurethane prepolymer can be applied to the surface to be coated by brushing, spraying or by any other suitable means. Preferably, when the composition is used to form a polyurethane coating, the prepolymer and cross-linking agent are dissolved in a volatile organic solvent therefor. Typical solvents which can be used for this purpose are butyl acetate, trichlorethylene and acetone.

Alternatively, polyurethanes according to the present invention can be prepared by reacting directly together a polyether polyol in which the repeating monomer unit has the general formula given above, an organic polyisocayanate or polyisothiocyanate, a cross-linking agent and, if desired, a catalyst for the cross-linking reaction. In this method the necessity of preparing a prepolymer is avoided.

Filler materials can also be incorporated in the solid polyurethane prior to its formation. These filler materials must be inert, in particular they must not react chemically to an appreciable degree with the isocyanato or isothiocyanato groups of the prepolymer (or unreacted polyisocyanate or polyisothiocyanate if no prepolymer is prepared) and must also be resistant to attack by other chemicals such as acids, alkalis and solvents. Typical fillers which can be used are silica, sand, quartz, asbestos and carbon black.

The solid polyurethanes can be obtained in coloured form by mixing with the prepolymer or polyether polyol suitable pigments such as the inorganic pigments, for example, chromium pigments and iron silicates.

Articles manufactured from or coated with solid polyurethanes according to the present invention possess excellent properties. The polyurethanes have excellent resistance to attack by chemicals such as acids, alkalis, water and organic solvents. The polyurethanes are also substantially impermeable to solvents such as petrol and fuel oils and they also have a good resistance to abrasion, particularly to chafing by ropes, a very low surface drag and are flame-resistant. The combination of these properties makes the polyurethanes particularly suitable for use as coatings on textile fabrics based on natural or synthetic fibres, on metals, on plastics and on natural or synthetic rubber. Textile fabrics formed into flexible fuel containers and coated with polyurethanes are of particular value since these are substantially impermeable to petrol and other fuel oils. The coated textile fabrics can also be used as tarpaulins. The polyurethanes can also be used in sheet form as fuel pump diaphragms and as solvent resistant coatings for hose.

The polyurethanes according to the present invention are more resistant to swelling in solvents and are more impermeable to these solvents than coatings based on copolymers of butadiene and acrylonitrile and polyurethanes based on other polyethers such as polypropylene glycol.

When the polyurethanes of the present invention are to be subjected to a temperature of 0° C., or below, for long periods, it is advisable to prepare the polyurethane in one of two ways. The polyurethane can be prepared from a prepolymer of a polyether polyol in which the repating unit has the aforementioned general formula mixed with a prepolymer based on a polyether polyol having the general formula $HO(C_nH_{2n}O)_mH$, wherein $n$ and $m$ are integers and preferably $n$ should have a value of at least 3 and $m$ a value so that the polyether has a molecular weight of at least 750. Such a polyether polyol is polypropylene glycol.

Alternatively, the polyurethanes which are to be subjected to low temperatures can be prepared from prepolymers based on a chain-extended polyether polyol in which the repeating unit has the general formula $$-CH(CH_2X)CH_2O-$$

wherein X represents a fluorine, chlorine or bromine atom or cyano group. Such prepolymers can be prepared by heating for long periods the polyether polyol with a polyisocyanate in amounts such that the ratio of the number of hydroxyl groups to the number of isocyanate groups is about 1:1.3. Usually, the polyether polyol and polyisocyanate are heated together for a time of 50 to 100 hours.

The invention is illustrated by the following examples in which all parts are by weight.

*Example I*

Two hundred and fifty parts of polyepichlorhydrin having a molecular weight of 900 obtainable commercially under the name Dow Polyglycol 166–900 were heated in a reaction vessel to a temperature of 120° C. under a pressure of 6 cm. of mercury whilst being stirred and maintained at this temperature for two hours to remove water from the polymer. The Dow Polyglycol 116–900 is a polyepichlorhydrin free of epoxy groups and containing terminal hydroy groups. It is made by polymerizing epichlorhydrin in the presence of a compound bearing an active hydrogen such as water or, preferably a glycol style compound as described in a publication of the Dow Chemical Company, "Choosing the Right Polyglycol," Code No. 164–33, published August 1956. After cooling to 90° C., the vessel was flushed with nitrogen and 0.05 part of benzoyl chloride was stirred into the polymer. 110 parts of tolylene diisocyanate were then added to the polymer over a period of 30 minutes and the mixture was maintained at a temperature of 90° C. with continuous stirring for two hours after the completion of the addition of the diisocyanate. The mixture was then allowed to cool to below 40° C. and transferred to an air-tight container. A viscous polyurethane prepolymer syrup was obtained which contained 9.42 percent by weight of reactive isocyanate groups.

100 parts of this syrup were mixed with 4.5 parts of trimethylol propane dissolved in 150 parts of acetone and 0.1 part of dibutyl tin dilaurate dissolved in 20 parts of butyl acetate. The solution so obtained was spread on to nylon fabric and the coated fabric was allowed to stand for 16 hours after which time a further coat was spread on. After 24 hours the solution had polymerised to a tough flexible film. Tests on the coated fabric showed that the coating was highly resistant to wear and to penetration by petrol.

*Example II*

In this example various coatings are compared.

A composition, denoted as A, was prepared by mixing together 120 parts of the polyurethane prepolymer syrup described in Example I, 5.4 parts of trimethylol propane dissolved in 180 parts of acetone and 0.12 part of dibutyl tin dilaurate dissolved in 124 parts of butyl acetate. The solution so obtained was cast on to a glass plate and after being allowed to stand for 4 days at room temperature a glossy film having a thickness of 0.57 mm. was stripped from the plate. The film had a very low surface drag.

Three other films were made from compositions denoted as B, C and D. Composition B was based on a copolymer of butadiene and acrylonitrile; composition C was based on a polyurethane prepared from polypropylene glycol having a molecular weight of 2,000, and composition D was based on a polyurethane prepared from diethylene glycol adipate having a molecular weight of about 3,000.

The physical properties of the four films were measured and these are shown in the following table.

TABLE

| Property | Composition | | | |
|---|---|---|---|---|
| | A | B | C | D |
| Tensile strength | 149 | 183 | 141 | 282 |
| Modulus | 60 | 35 | 42 | 15 |
| Tear resistance | 11.1 | 15.0 | 14.6 | -------- |
| Volume Swelling in: | | | | |
| Petroleum naphtha (percent) | 2.6 | 9.4 | 34 | 9.5 |
| Coal tar naphtha (percent) | 33 | 58 | 107 | 58 |
| Trichloroethylene (percent) | 49 | -------- | 215 | 282 |
| Relative solvent Transmission | 0.051 | 1.00 | 7.40 | 0.16 |

In the above table tensile strength and modulus are expressed in kilogrammes per square centimetre and the modulus is measured at an elongation of 100 percent. The tear resistance is expressed in kilogrammes per testpiece. The relative solvent transmission was measured by comparing the rate of transmission of petroleum naphtha through the film of the material and is expressed relative to the rate of transmission obtained with film manufactured from a butadiene/acrylonitrile copolymer of the same thickness.

It will be seen from the above table that the composition denoted as A has the greatest resistance to swelling by solvents and also the lowest solvent transmission. Also the composition possesses good strength properties.

*Example III*

120 parts of the polyurethane prepolymer syrup described in Example I were mixed with 350 parts of ethyl acetate which had been saturated with water at room temperature and 0.12 part of dibutyl tin dilaurate. The solution so obtained was cast on to a glass plate and allowed to stand for four days at room temperature after which time a clear glossy film was stripped from the glass plate.

The physical properties of the film were measured and these are given below.

Tensile strength _____ 157
Modulus _____ 85
Elongation at break (percent) _____ 315
Tear resistance _____ 15.1
Relative solvent transmission _____ 0.050

The tensile strength and modulus are expressed in kilogrammes per square centimetre and the modulus was measured at an elongation of 100 percent. The tear resistance is expressed in kilogrammes per test-piece and the relative solvent transmission was measured using petroleum naphtha as solvent.

*Example IV*

This example illustrates the improvements obtained in the resistance to chafing when a polyurethane, according to the present invention, is used as a coating.

20 parts of the polyurethane prepolymer syrup described in Example I were mixed with 1 part of trimethylol propane dissolved in 10 parts of methyl ethyl ketone and 0.2 part of a stabiliser for polyvinyl chloride consisting of a mixture of barium stearate and cadmium stearate obtainable commercially under the name Advastab BC 100. The mixture was allowed to stand for 16 hours at room temperature and then 0.02 part of dibutyl tin dilaurate dissolved in 2 parts of butyl acetate was added. A polyurethane prepolymer lacquer was obtained.

A piece of nylon fabric which had been proofed with a composition containing neoprene and a tarpaulin consisting of fabric coated with a plasticised polyvinyl chloride composition were each coated with a solution containing triphenylmethane triisocyanate obtainable commercially under the name Desmodur R dissolved in methylene chloride. The ratio of the amount of triisocyanate to the amount of methylene chloride was 1:6. After standing for 15 minutes the coated fabrics were each coated with the lacquer described above by brushing.

The coated fabrics were then allowed to stand for 5 minutes at room temperature and then for 20 minutes in a current of air at 70° C. The lacquer was set by increasing the temperature of the air current to 150° C., and maintaining the coated fabrics at this temperature for 20 minutes. When cold, each of the coated fabrics was observed to have a glossy flexible polyurethane coating which was tack-free and which adhered strongly to the fabric.

The resistance to abrasion of each of the samples of the fabric coated with polyurethane was compared with fabric which was not coated with polyurethane by rubbing the fabrics with a rope under tension. The results, which are shown below, are expressed as the average number of strokes of the rope needed to expose the tensile fabric.

|  | Control | Polyurethane coated |
|---|---|---|
| Neoprene coated nylon fabric | 6 | 25 |
| P.V.C. tarpaulin | 10 | 34 |

It will be seen that the abrasion resistance is considerably increased when the fabric and tarpaulin are coated with the polyurethane composition in addition to the coating of neoprene or polyvinyl chloride.

*Example V*

This example illustrates the preparation of a polyurethane which is suitable for use at low temperatures.

770 parts of the polyepichlorhydrin used in Example I were mixed with 355 parts of toluene diisocyanate and 0.15 part of benzoyl chloride. The mixture was stirred and heated in an atmosphere of nitrogen for 13 hours at 100° C. to produce a liquid prepolymer. A second prepolymer was prepared by heating to 90° C. in an atmosphere of nitrogen a mixture of 1,200 parts of polypropylene glycol of molecular weight about 2,000, 36 parts of trimethylolpropane and 0.24 part of benzoyl chloride. 240 parts of toluene diisocyanate were then added to the mixture over a period of 20 minutes, and the temperature was maintained at 90° C. for a further 60 minutes. A further 288 parts of toluene diisocyanate were then added over a period of 15 minutes and the resulting prepolymer was cooled to room temperature.

40 parts of the prepolymer based on polyepichlorhydrin and 60 parts of the prepolymer based on polypropylene glycol were dissolved in 300 parts of ethyl acetate which was saturated with water, and 6 parts of a 1 percent solution of dibutyl tin dilaurate in butyl acetate.

The solution was cast on to glass plates which were allowed to stand at room temperature for 3 days. A strip of the film 1 cm. in width was subjected to flexing at −8° C. in a De Mattia-type machine having sets of jaws adjusted to be 8.7 cm. apart or the maximum and 3.0 cm. apart at the minimum. The rate of flexing was 17,200 flexes per hour. The sample of film withstood 1,500,000 flexes. The film had a relative solvent transmisison of 0.54 that of a standard butadiene/acrylonitrile copolymer.

*Example VI*

This example illustrates the use of a polyurethane prepared from the prepolymers illustrated in Example V as a coating.

40 parts of the prepolymer based on polyepichlorhydrin and 60 parts of the prepolymer based on polypropylene glycol, described in Example V, were mixed together. 24 parts of the mixed prepolymers were mixed with 16 parts of a 10 percent solution of trimethylol propane in butyl acetate and 2 parts of a 1 percent solution of dibutyl tin dilaurate in butyl acetate to give a prepolymer solution.

The prepolymer solution was applied to fine mesh nylon fabric by a brush and allowed to dry for 4 hours. This was repeated until, in all, 6 coats of the solution had been applied and the fabric was then heated for 20 minutes at 125° C. The weight of the coating was 12 ounces per square yard.

The coated fabric was suitable for use as petrol-pump diaphragms and withstood 2,000,000 flexes on a De Mattia-type machine as described in Example V. The relative solvent transmission was only one-fiftieth that of a similar fabric coated with a butadiene/acrylonitrile copolymer.

*Example VII*

This example illustrates the preparation of polyurethane suitable for use at a low temperature.

200 parts of polyepichlorhydrin having a molecular weight of 1150 obtainable commercially under the name Dow Polyglycol 116–1150, were mixed with 0.04 part of benzoyl chloride and 36.5 parts of toluene diisocyanate. The Dow Polyglycol 116–950 is a polyepichlorhydrin free of epoxy groups and containing terminal hydroxy groups. It is made by polymerizing epichlorhydrin in the presence of a compound bearing an active hydrogen such as water or, preferably a glycol style compound as described in a publication of the Dow Chemical Company, "Choosing the Right Polyglycol," Code No. 164–33, published August 1956. The mixture was heated at 100° C. in an atmosphere of nitrogen for 6 hours and was stirred continuously. The mixture was then heated without stirring at 100° C. for a further 55 hours. The prepolymer obtained by this method comprised a chain-extended polyglycol and was a hard rubbery mass which was soluble in organic solvents.

30 parts of the prepolymer were dissolved in 60 parts of dry ethyl acetate by heating under reflux conditions and the solution was then cooled to room temperature. 30 parts of ethyl acetate which had been saturated with water, and 6 parts of a 1 percent solution of dibutyl tin dilaurate in butyl acetate were then added to the solution of the prepolymer. The solution was cast on a glass plate and allowed to stand for 3 days at room temperature. A rubber-like film 0.4 mm. in thickness was obtained.

A strip 1 cm. in width of the film was subjected to flexing at −8° C. in a De Mattia-type machine having sets of jaws adjusted to be 8.7 cm. apart at the maximum and 3.0 cm. at the minimum. The rate of flexing was 17,200 cycles per hour. The sample of the film withstood 164,000 flexes before breaking.

The permeability of the film of prepolymer to petroleum naphtha was only one-fiftieth of that of a sheet of butadiene/acrylonitrile copolymer of similar thickness.

Having now described our invention, what we claim is:

1. A method for the preparation of a solid polyurethane which comprises mixing a polyurethane prepolymer containing at least two isocyanato end groups comprising the reaction product of polyepichlorhydrin polyol free of epoxy groups having an average molecular weight of at least 900 containing at least two terminal hydroxy groups and in which the repeating monomer unit has the general formula —CH(CH$_2$Cl)CH$_2$O—, and the organic diisocyanate, with a cross-linking agent for the said prepolymer selected from the class consisting of water, glycols and polyhydric alcohols, and allowing the polyurethane prepolymer to become cross-linked.

2. A solid polyurethane which comprises a reaction product of an organic diisocyanate and a polyepichlorhydrin polyol having an average molecular weight of at least 900 free of epoxy groups, containing at least two terminal hydroxy groups and in which the repeating monomer unit has the general formula —CH(CH$_2$Cl)CH$_2$O—.

3. A solid polyurethane which comprises a reaction product of an organic diisocyanate admixed with a polyepichlorhydrin polyol free from epoxy groups having an average molecular weight in a range from about 900 to about 1150, containing at least two terminal hydroxy groups and in which the repeating monomer group has the general formula —CH(CH$_2$Cl)CH$_2$O— and a polyether polyol having the general formula HO(C$_n$H$_{2n}$O)$_m$H wherein $n$ represents an integer greater than 2 and $m$ is selected so that the polyether polyol has a molecular weight of at least 750.

4. A solid polyurethane which comprises a reaction product of an organic diisocyanate and a polyepichlorhydrin polyol having an average molecular weight in a range from about 900 to about 1150 free of epoxy groups, containing at least two terminal hydroxy groups and in which the repeating monomer unit has the general formula —CH(CH$_2$Cl)CH$_2$O—.

5. A solid polyurethane according to claim 3 in which the polyepichlorhydrin polyol and the polyether polyol having the general formula HO(C$_n$H$_{2n}$O)$_m$H are mixed prior to reaction with an organic diisocyanate.

6. A method for the preparation of a solid polyurethane which comprises mixing a polyurethane prepolymer containing at least two isocyanato end groups comprising the reaction product of a polyepichlorhydrin polyol free of epoxy groups having an average molecular weight in a range from about 900 to about 1150 containing at least two terminal hydroxy groups and in which the repeating monomer unit has the general formula —CH(CH$_2$Cl)CH$_2$O—, and an organic diisocyanate, with a cross-linking agent for the said prepolymer selected from the class consisting of water, glycols, and polyhydric alcohols, and allowing the polyurethane prepolymer to become cross-linked.

7. A method according to claim 6 in which the amount of the organic diisocyanate used is up to 20 percent molar proportions based on the said polyepichlorhydrin polyol.

8. A method according to claim 7 in which the amount of the organic diisocyanate is up to 5 percent molar proportions based on the polyepichlorhydrin polyol.

9. A method according to claim 6 in which the amount of the organic diisocyanate used is such that the ratio of the number of hydroxyl groups to the number of isocyanato groups is about 1:1.3.

10. A method according to claim 6 in which the polyurethane prepolymer also contains the reaction product of a polyether polyol having the general formula HO(C$_n$H$_{2n}$O)H wherein $n$ represents an integer of at least 3 and $m$ is selected such that the polyether polyol has a molecular weight of at least 750, and an organic diisocyanate.

11. A method according to claim 7 in which the polyepichlorhydrin polyol and the polyether polyol having the general formula HO(C$_n$H$_{2n}$O)$_m$H are mixed prior to reaction with an organic diisocyanate.

12. The solid polyurethane of claim 4 in which the organic diisocyanate is toluene diisocyanate.

13. The method of claim 6 in which the diisocyanate is tolyl diisocyanate.

References Cited by the Examiner

UNITED STATES PATENTS

| | | | |
|---|---|---|---|
| 2,581,464 | 1/1952 | Zech | 260—2 |
| 2,698,315 | 12/1954 | Greenlee | 260—77.5 |
| 2,829,984 | 4/1958 | Yaeger | 260—77.5 |
| 2,902,398 | 9/1959 | Schroeder | 260—2 |
| 2,919,800 | 3/1960 | Hill | 260—77.5 |
| 2,929,800 | 3/1960 | Hill | 260—77.5 |
| 3,000,757 | 9/1961 | Johnston | 117—63 |
| 3,026,270 | 3/1962 | Robinson | 260—77.5 |
| 3,076,784 | 2/1963 | Schulte-Huermann | 260—2.5 |

FOREIGN PATENTS

| | | |
|---|---|---|
| 2,212,252 | 10/1959 | France. |
| 733,624 | 7/1955 | Great Britain. |

OTHER REFERENCES

Naming and Indexing of Chemical Compounds, Chemical Abstracts, vol. 46, No. 24.

Webster's International Dictionary, 3rd Ed., p. 1173, "Choosing the Right Polyglycol," Dow Chemical, Aug. 1956.

LEON J. BERCOVITZ, *Primary Examiner.*

HAROLD N. BURSTEIN, DONALD E. CZAJA,
*Examiners.*